United States Patent
Beverett

[15] 3,696,733
[45] Oct. 10, 1972

[54] AUTOMATIC DRIPOLATOR, SINGLE COMPARTMENT

[72] Inventor: James H. Beverett, 410 Nottingham Road, Montgomery, Ala. 36109

[22] Filed: May 6, 1971

[21] Appl. No.: 140,707

[52] U.S. Cl.................................99/307, 99/315
[51] Int. Cl..................................A47j 31/10
[58] Field of Search........99/302, 297, 300, 304, 307, 99/316, 317, 319, 320, 306, 310, 311, 313, 314, 315

[56] References Cited

UNITED STATES PATENTS

| 1,136,776 | 4/1915 | Collins | 99/314 |
| 1,504,500 | 8/1924 | Pizzoglio | 99/315 |
| 1,632,342 | 6/1927 | Lambert | 99/315 |
| 3,527,153 | 9/1970 | Orlando | 99/315 |

Primary Examiner—Robert W. Jenkins
Attorney—Clarence A. O'Brien and Harvey B. Jacobson

[57] ABSTRACT

A single cycle coffee maker incorporating a vertically sliding separator which divides a single compartment coffeepot into upper and lower chambers. The lower chamber receives the water which is pumped upwardly and discharged through the coffee grains into the upper chamber. The separator rides downwardly on the decreasing water level in the lower chamber, increasing the capacity of the upper chamber as the brewed coffee builds-up therein. The separator is solid and a side pump or delivery tube is utilized.

8 Claims, 8 Drawing Figures

PATENTED OCT 10 1972 3,696,733

James H. Beverett
INVENTOR.

BY Clarence A. O'Brien
and Harvey B. Jacobson
Attorneys

James H. Beverett
INVENTOR.

BY Clarence A. O'Brien
and Harvey B. Jacobson
Attorneys

James H. Beverett
INVENTOR

AUTOMATIC DRIPOLATOR, SINGLE COMPARTMENT

The invention herein generally relates to improvements in electrically operated coffee makers, and is more particularly directed to the type of coffee maker incorporating a slidable separator to maintain the water and brewed coffee separate at all times within a single compartment.

Coffee makers incorporating vertically sliding separators have been known for years, the particular advantages thereof including the fact that a non-recycling process of coffee brewing can be effected utilizing a coffee maker of generally conventional size and appearance. Such a non-recycling process in turn has been recognized as achieving a coffee brew of substantially improved flavor and aroma.

It is a primary object of the instant invention to provide an electrically operated automatic percolating dripolator which, while substantially conventional in appearance, incorporates a unique internal construction including a side delivery tube and a separator assembly with integral self-guiding features which do not require a central delivery tube.

In conjunction with the above object, it is a significant object of the instant invention to provide an automatic dripolator which includes a completely unencumbered single compartment, eliminating the central delivery tube which is normally difficult to properly seat, and simplifying the manner of positioning and mounting the basket, in conjunction with a simplification of the structure of the basket and the manner of loading the coffee grains therein.

Other objects of the invention include the provision of unique structural features on the separator which operate to properly maintain the separator in a horizontal plane throughout the range of vertical movement thereof, the configuration of the base of the compartment so as to closely receive and seat the separator in the lower position thereof whereby a complete expelling of water is insured, and the provision of a separator wherein no leakage can occur between the upper and lower chambers defined thereby. This latter feature is greatly simplified by elimination of the central delivery tube and the difficulties inherent in providing a proper seal thereabout.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
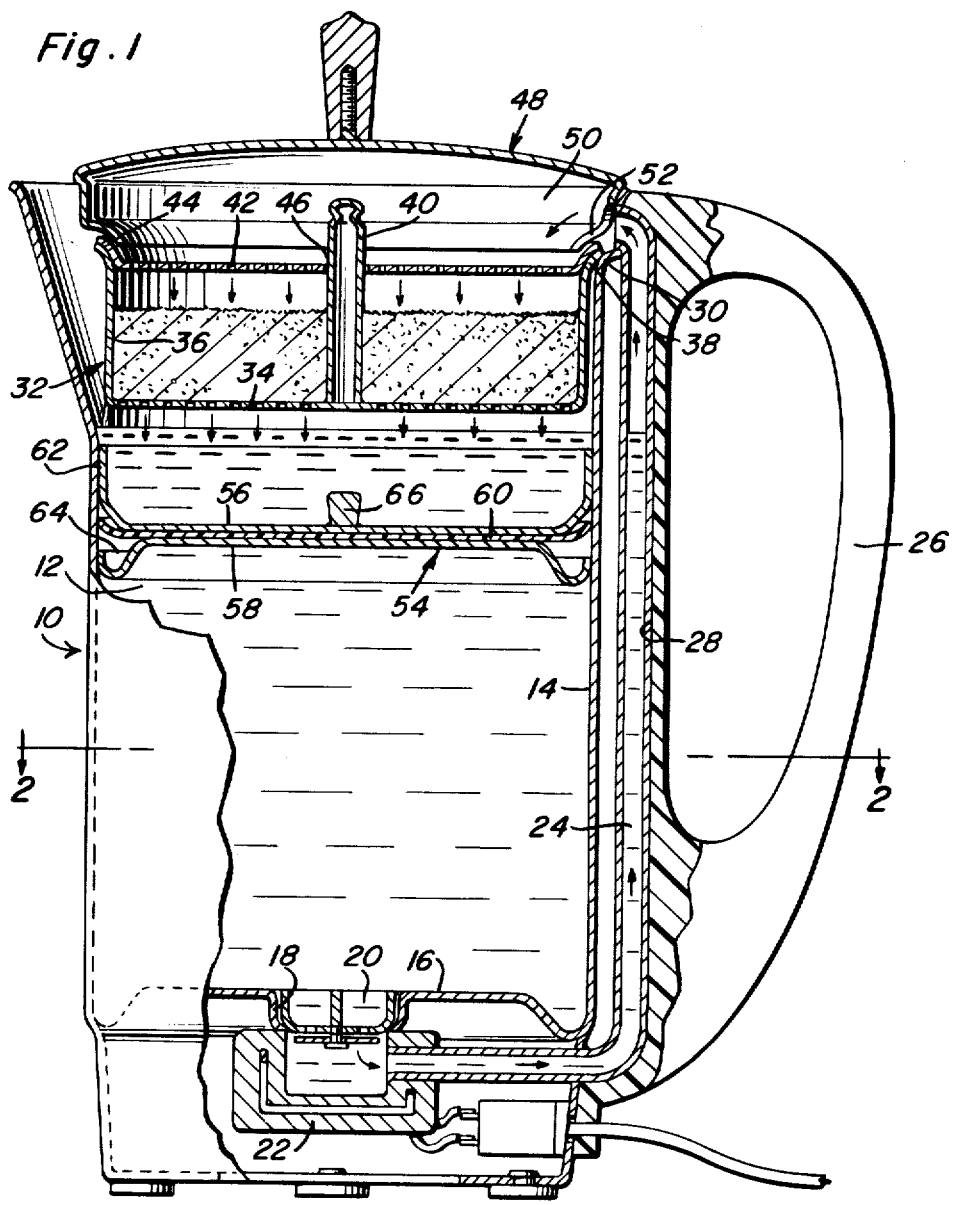
FIG. 1 is a vertical view, partially in cross-section, of a dripolator incorporating the features of the instant invention.

Referring now more specifically to the drawings, reference numeral 10 is used to generally designate a percolator type coffeepot incorporating the features of the instant invention. The pot, configured in the manner of a conventional pot, includes a single vertical interior compartment 12 including a cylindrical wall 14, a bottom 16 and an open top.

The bottom 16 of the compartment is provided with a central well 18 within which is secured a conventional pump valve unit 20, selectively communicating the compartment 12 with an underlying electric heating unit 22 of any appropriate construction. The heating unit will of course have conventional controls and warming elements associated therewith.

The pump or delivery tube 24 has the lower end thereof in water receiving communication with the heating unit 22 and projects laterally therefrom below the bottom 16 of the compartment 12 to a point just outward of the compartment wall 14, preferably in alignment with the handle 26. In order to position the delivery tube 24 exteriorily of the cylindrical compartment 12, and yet not distract from the desired conventional appearance of the pot 10, the vertical inner or pot engaging portion of the handle 16 is provided with an internal recess or channel 28 through which the tube 24 extends. The upper end of the tube is inwardly turned and positioned so as to discharge inwardly over the outwardly flared upper lip 30 of the pot wall 14.

The coffee grind receiving basket 32, incorporating a perforated bottom 34 and an imperforate side wall 36, differs from a conventional basket in that no central aperture is required for engagement about a central delivery tube. The basket 32, on the contrary, is directly supported on the outwardly flared upper lip 30 of the wall 14 through an engagement thereon of a similar outwardly flared lip 38 about the basket wall 36. A vertically projecting handling stem 40 is affixed to and rises centrally from the basket 32 so as to simplify the insertion and removal thereof. If deemed desirable, a circular perforated spreader plate 42, having an upwardly and outwardly flared peripheral edge 44 engaged over the basket lip 38, can be provided over the top of the basket 32 directly below the discharge end of the delivery tube 24 so as to assure an equalization of the distribution of the water over the entire bed of coffee grains to be received within the basket 32. This plate 42 will include an enlarged central opening 46 therethrough which accommodates the basket stem 40.

The basic construction of the coffee maker is completed by the provision of a removable lid 48 incorporating a down-turned peripheral flange or wall 50. This lid wall 50 has a recess or opening 52 therethrough which is alignable with the discharge end of the delivery tube 24 so as to not interfere with the desired inward discharging of the pumped water, the slightly domed configuration of the lid 48 facilitating a proper distribution of the water.

The construction thus far described presents a coffee maker unit, utilizing a unique side delivery tube 24 so as to maintain the compartment free of obstructions, which is completely capable of being utilized in the manner of a conventional recycling percolator. However, it is primarily the intention of the instant invention to provide a device usable in a non-recycling coffee making procedure. Thus, a compartment dividing separator 54 is provided.

The separator 54 divides the vertically elongated compartment 12 into upper and lower chambers with the separator 54 vertically adjusting within the compartment 12 in accordance with the level of liquid in the respective compartments. In other words, as the water is drawn from the lower chamber by the pumping apparatus and introduced into the upper chamber through the coffee basket, the separator 54 lowers to progressively enlarge the upper chamber and accommodate the increasing amount of brewed coffee. The downward movement of the separator 54 will be accomplished by a combination of several factors including a slight vacuum created in the lower chamber as the water is drawn therefrom and the progressively increasing weight of the brewed coffee in the upper chamber. Utilizing the separator 54, it will be appreciated that a single passage of the water through the coffee basket is effected, thus producing in effect a non-cycling coffee making system adapted to produce the maximum in good flavor and aroma.

It will of course be appreciated that a proper and effective seal must be maintained by the separator 54 between the upper and lower chambers throughout the range of movement thereof. Accordingly, specific care is taken to insure that the separator 54 be maintained horizontal throughout the vertical extent of its movement. In construction, the separator 54 includes upper and lower discs 56 and 58 sandwiching a flat flexible sealing sheet 60 therebetween. The upper disc 56 includes a cylindrical upwardly projecting wall 62 thereabout which conforms to the inner surface of the compartment wall 14 and is of a size so as to slidingly engage therewith for guided vertical movement therealong while at the same time precluding undesirable tipping or tilting of the separator such as might effect a leakage between the chambers. The lower disc 58 includes a peripheral edge portion deformed downwardly and then upwardly so as to provide a concave groove-like configuration 64 completely thereabout with the extreme outer lip or edge also slidingly engaged with the compartment wall 14. The sealing sheet 60, positioned between the discs 56 and 58, has the peripheral edge portion thereof projecting outwardly between the opposed edge portions of the discs 56 and 58 peripherally thereabout for a flexed engagement thereof with the inner surface of the wall 14, providing in effect a wiping surface conforming contact therewith. The discs 56 and 58 are positively bonded together in any appropriate manner with the seal 60 therebetween so as to provide in effect an integral unit. Further, the upper disc 56 includes an upwardly projecting centrally located knob 66 which facilitates the insertion and removal of the separator. As will be appreciated, the cup shape of the upper disc 56 receives the coffee therein in a manner which tends to equalize the load on the separator 54 so as to further assist in a vertical adjustment of the separator while maintaining the desired horizontal orientation thereof. In order to insure that no appreciable amount of water remains in the lower chamber upon completion of the brewing cycle, it will be noted that the bottom 16 of the compartment 12 has been peripherally configured so as to receive the downwardly deformed edge portion 64 of the lower disc 58, thus enabling a complete seating of the lower separator disc 58 on the compartment bottom 16. Incidentally, it will be noted that the upper disc 56 is provided with a rounded edge at the point of joinder therewith with the vertical side wall 62, this rounded edge cooperating with the downturned edge portion of the bottom disc 58 in providing a small peripheral recess for the accommodation of the projecting flexing edge portion of the seal 60.

Figure 4:
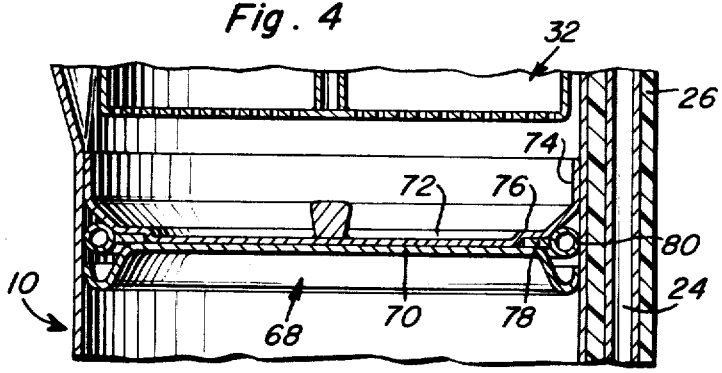
FIG. 4 is a cross-sectional detail illustrating the utilization of a modified form of separator.
Figure 2:
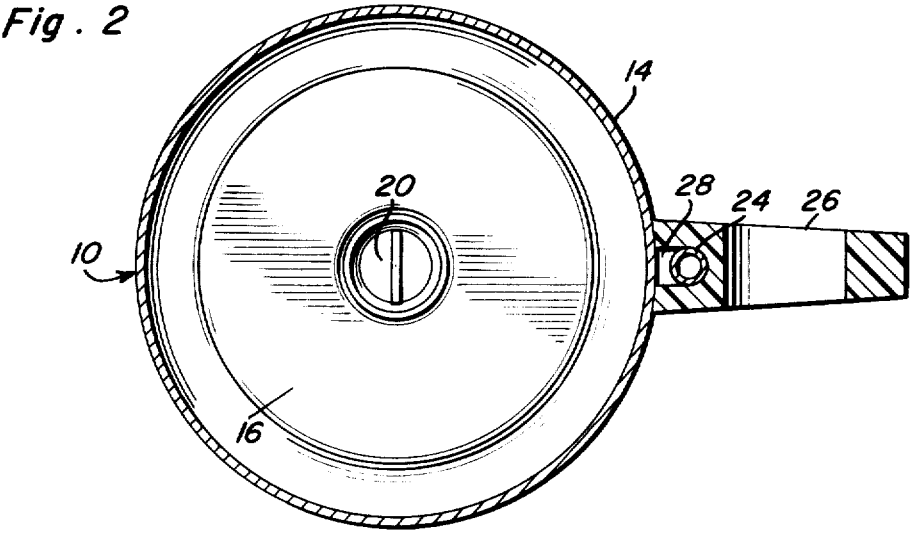
FIG. 2 is a cross-sectional view taken substantially on a plane passing along line 2—2 of FIG. 1.
Figure 3:
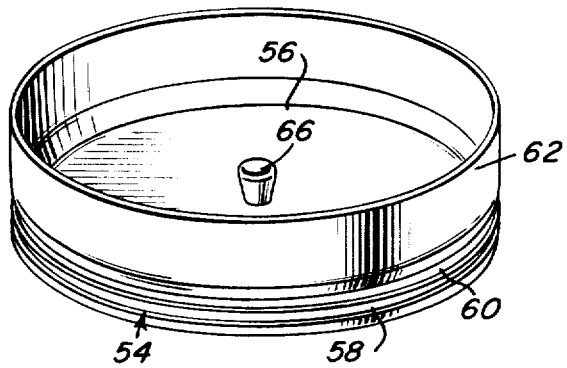
FIG. 3 is a perspective view of the separator.

With reference to FIG. 4, a slightly modified form of separator 68 has been illustrated therein. The separator 68 includes a lower disc 70 which corresponds in construction to the lower disc 58, and an upper disc 72 which differs from the upper disc 56 only in that the disc 72, immediately inward of the integral vertical wall 74, is provided with an upwardly offset peripheral portion 76 which receives an annular flange 78 on an outwardly positioned flexible tubular seal 80 positioned within the annular recess provided between the discs 70 and 72. In this variation of the separator 68, the upper and lower discs have the major central portions thereof directly engaged with each other and may be spot welded or otherwise permanently bonded so as to effectively maintain the tubular seal and effect a positive vertical guiding of the separator as the relative sizes of the upper and lower chambers change.

Figure 6:
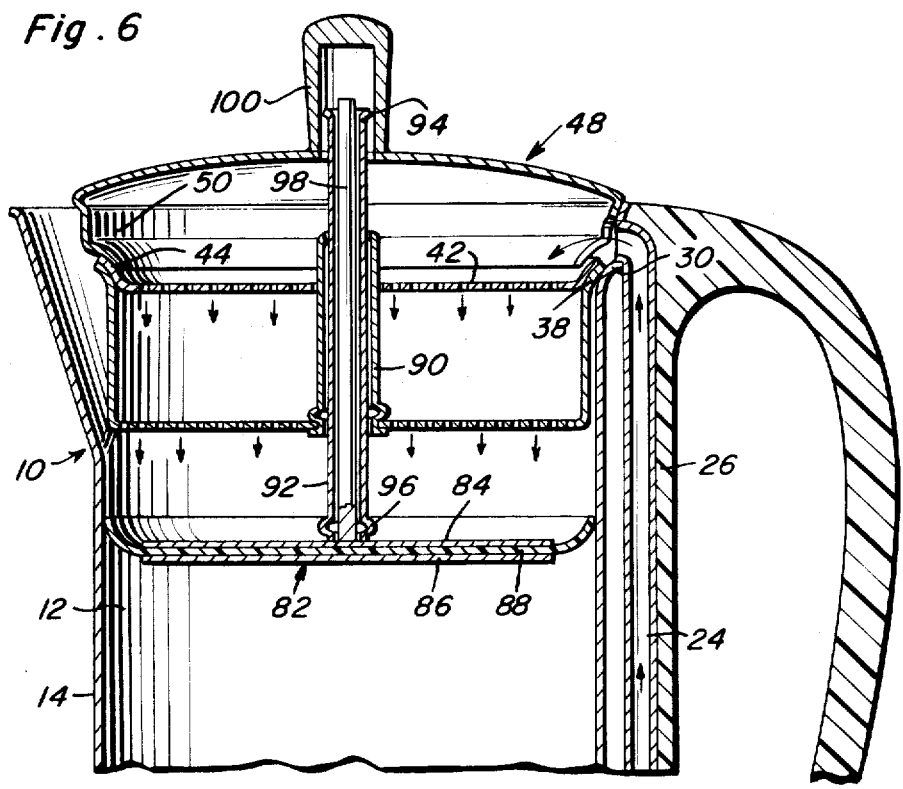
FIG. 6 is a cross-sectional detail illustrating yet another form of separator.
Figure 7:
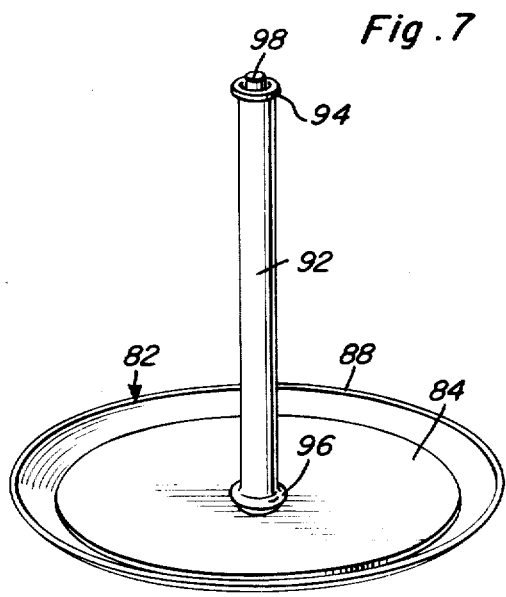
FIG. 7 is a perspective view of the separator of FIG. 6.
Figure 8:
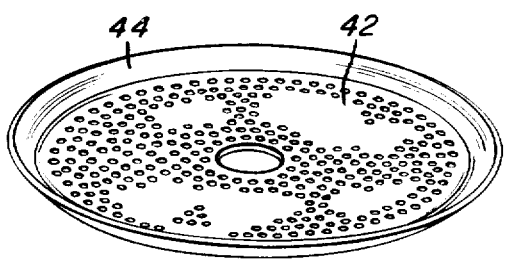
FIG. 8 is a perspective view of the spreader plate utilized to effect an equalization of the distribution of the water through the basket contained coffee grinds.

With reference to FIGS. 6 and 7, yet another form of separator 82 has been illustrated therein. The separator 82 includes circular upper and lower rigid discs 84 and 86 which terminate inward of the surrounding compartment wall 14 and which fixedly sandwich an enlarged circular sheet like flexible seal 88 therebetween. The seal 88 has the peripheral edge portion thereof projecting a substantial distance beyond the edges of the discs 84 and 86 for a positive wiping engagement with the interior of the compartment wall 14 so as to form an upwardly arcing disc-like configuration contemplated to effectively retain the brewed coffee introduced into the upper compartment as the separator 82 lowers in response to the changing liquid levels.

It is of course also essential that the separator 82 be maintained horizontally during its vertical movement through the compartment 12. Accordingly, the basket stem 90, which is generally equivalent to the previously described basket stem 40, is formed in the nature of an elongated sleeve open at the upper and lower ends thereof. A second substantially longer sleeve 92 is slidably received through the basket stem 90 with the upper and lower limits of sliding movement of the sleeve 92 relative to the stem 90 being defined by upper and lower enlargements 94 and 96 provided on the sleeve 92. Finally, an elongated stem 98 is affixed centrally to the upper disc 84 of the separator 82 and is inturn slidably received within the sleeve 92. Thus, as the separator 82 moves downwardly in the compartment 12, the stem 98 and sleeve 92 lower through the basket stem 90 together until the upper sleeve enlargement 94 engages against the upper end of the basket stem 90, at which point further descent of the separator 82 results in an outward sliding of the separator stem 98 relative to the now stable sleeve 92. It will of course be appreciated that the combined height of the stem 90 and sleeve 92 are greater than the height of the compartment 12 so as to insure a proper engagement therebetween throughout the full range of vertical movement of the separator 82. Thus, it will be appreciated that a positive guiding of the separator 82 will be provided for. Incidentally, as a variation of the guiding system just described, the stem 98 can be made substantially longer, such as by extending the hollow lid knob 100 to even a greater height than that illustrated in FIG. 6 so as to enable a further elongation of the stem 98 to accommodate, through a direct sliding thereof within the basket stem 90 without the intermediate sleeve 92, the full range of vertical movement of the separator 82.

It will be noted that the coffee maker of FIG. 6 also incorporates the external handle concealed delivery tube 24. This tube, as well as the other components which have not been specifically described and directly relate to similar components of the form of FIG. 1 have been given like reference numerals.

Figure 5:
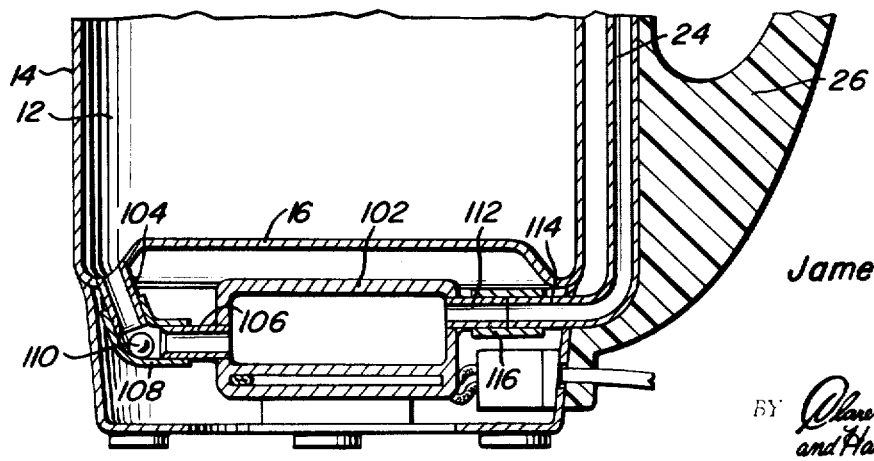
FIG. 5 is a cross-sectional detail of an alternate form of heating and pumping assembly.

Attention is now directed to FIG. 5. This Figure illustrates the manner in which the percolator of the instant invention can be adapted to accommodate any of the number of flat or cylindrical closed type heating units 102 normally found in European double compartment coffee makers. When using this type of heating unit, water is fed from the lower chamber through a side tube 104 which is connected to the inlet tube 106 of the heating unit by means of a plastic sleeve 108 telescopically received over the opposed tube ends. Positioned within the sleeve 108 is a ball 110 which acts in the manner of a check valve by seating against the lower end of the tube 104 when water is being pumped from the heating unit 102. The outlet tube 112 of the heating unit 102 is connected to the lower end of the delivery tube 114 by an appropriate sleeve 116, thus greatly facilitating an assembly of the device.

From the foregoing, it will be appreciated that a highly unique percolator type coffee maker has been devised which can be simply converted from a recycling type unit to a non-recycling unit by merely the insertion of a separator assembly. The separator assembly is specifically constructed so as to insure a proper guided movement thereof throughout the full extent of vertical travel without the necessity of relying on an inconvenient central pump or delivery tube. The entire construction is contained within a coffee maker which is conventional in appearance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A coffee maker comprising an open top vertically elongated compartment, said compartment including a peripheral wall and a bottom, a heating and pumping assembly communicated with the interior of the compartment through said bottom, a water delivery tube extending vertically along the exterior of said compartment, said tube including a lower end in flow receiving communication with said heating and pumping assembly and an upper end in flow discharging communication with the upper end of said compartment, a separator positioned horizontally in said compartment and defining separate upper and lower chambers therein, said separator being in sealed vertically sliding engagement with the compartment wall for a vertical movement therein in response to respective liquid levels in the upper and lower chambers.

2. The coffee maker of claim 1 wherein said separator includes seal means and guide means, said seal means engaging the compartment wall completely thereabout, said guide means comprising upper and lower discs sandwiching said seal means therebetween, each of said discs including a peripheral portion in guiding sliding engagement with said compartment wall.

3. The coffee maker of claim 2 wherein said upper disc includes an annular wall extending upwardly therefrom peripherally thereabout, and defining a cylindrical cup like configuration conforming to the interior of said compartment.

4. The coffee maker of claim 3 wherein said lower disc includes a peripheral edge portion configured to define a downwardly offset annular groove vertically spaced below the upper disc wall to define an annular area therebetween for the accommodation of the wall engaging edge portion of the seal means.

5. The coffee maker of claim 2 including a coffee grind basket positioned in the upper end of said compartment, said basket including a central upwardly projecting hollow stem opening through the bottom of the basket and incorporating an open upper end, said guide means comprising a vertically elongated stem affixed centrally to said separator and projecting vertically upward therefrom for sliding reception within said basket stem.

6. The coffee maker of claim 5 including a sleeve slidably received about said separator stem and within said basket stem, said sleeve being selectively slidable relative to said basket stem, said separator stem being slidable relative to and with said sleeve.

7. The coffee maker of claim 2 including a vertically elongated handle affixed to the exterior of said compartment wall, said handle including a vertically elongated recess therein, said delivery tube, exterior of said compartment, being concealed within said handle recess.

8. A coffee maker comprising an open top vertical compartment, said compartment including a peripheral wall and a bottom, a heating and pumping assembly in communication with the interior of the compartment through the bottom thereof, a water delivery tube extending vertically along the exterior of said compartment, said tube including a lower end in flow receiving communication with said heating and pumping assembly and an upper end in flow discharging communication with the upper end of said compartment, a handle mounted vertically along the exterior of said compartment wall, said handle including a vertically elongated recess therein, said delivery tube, exteriorily of said compartment, being concealed within said handle recess.

* * * * *